(12) United States Patent
Chang et al.

(10) Patent No.: US 8,527,229 B2
(45) Date of Patent: Sep. 3, 2013

(54) TEST SYSTEMS WITH MULTIPLE ANTENNAS FOR CHARACTERIZING OVER-THE-AIR PATH LOSS

(75) Inventors: Thomas W. Chang, Sunnyvale, CA (US); Peter Bevelacqua, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 12/872,206

(22) Filed: Aug. 31, 2010

(65) Prior Publication Data

US 2012/0053879 A1   Mar. 1, 2012

(51) Int. Cl.
*G01C 19/00*   (2013.01)

(52) U.S. Cl.
CPC ...................................... *G01C 19/00* (2013.01)
USPC .......................................................... 702/104

(58) Field of Classification Search
CPC ........................................................ G01C 19/00
USPC ................. 702/104, 117, 118, 182–185, 188
See application file for complete search history.

(56) References Cited

U.S. PATENT DOCUMENTS

| 2008/0056340 | A1 | 3/2008 | Foegelle |
| 2010/0171650 | A1 | 7/2010 | Okano et al. |
| 2011/0084887 | A1 * | 4/2011 | Mow et al. ..................... 343/703 |

FOREIGN PATENT DOCUMENTS

| WO | 2010040887 | 4/2010 |
| WO | 2010059103 | 5/2010 |

OTHER PUBLICATIONS

Mow et al., U.S. Appl. No. 12/577,128, filed Oct. 9, 2009.
Gregg et al., U.S. Appl. No. 61/351,821, filed Jun. 4, 2010.
Gregg et al., U.S. Appl. No. 61/351,792, filed Jun. 4, 2010.
Mow et al., U.S. Appl. No. 61/329,455, filed Apr. 29, 2010.

\* cited by examiner

*Primary Examiner* — Edward Raymond
(74) *Attorney, Agent, or Firm* — Treyz Law Group; Jason Tsai (57) ABSTRACT

Calibration equipment for calibrating multiple test stations in a test system is provided. Each test station may include a test unit, a test chamber with multiple antennas, and radio-frequency (RF) cables that connect the test unit to the multiple antennas within the test chamber. Reference devices under test (DUTs) may be used to calibrate the OTA path loss of each test station while switching one of the multiple antennas into use one at a time at desired frequencies. A preferred antenna list indicating the preferred antenna that provides the optimal path loss for each desired frequency may be generated. Once calibrated, the test stations may be used during product testing to test factory DUTs to determine whether a particular production DUT satisfies pass/fail criteria. During product testing, a selected one of the multiple antennas is enabled based on the preferred antenna list to perform desired measurements.

24 Claims, 7 Drawing Sheets

PATH LOSS TABLE ⎯52

| FREQ | ANT1 | ANT2 | ANT3 | ANT4 |
|---|---|---|---|---|
| $f1$ | − 40.5 | − 39.8 | − 39.6 ⎯54 | − 41.1 |
| $f2$ | − 41.0 | − 38.9 ⎯56 | − 40.9 | − 40.2 |
| ⋮ | | | | |

TEST SYSTEMS WITH MULTIPLE ANTENNAS FOR CHARACTERIZING OVER-THE-AIR PATH LOSS

BACKGROUND

This relates generally to testing wireless electronic devices, and more particularly, to calibrating test equipment and using the calibrated test equipment to test wireless electronic devices.

Wireless electronic devices typically include transceiver circuitry, antenna circuitry, and other radio-frequency circuitry that provides wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, etc.

The performance of a wireless DUT can be measured using an over-the-air (OTA) test station. An OTA test station includes a test chamber having a test chamber antenna, a test unit, and a test host. The antenna is connected to the test unit and is used in sending and receiving radio-frequency (RF) signals to and from the test unit. The test host is connected to the test unit and directs the test unit to perform desired operations during testing.

During test operations, a wireless DUT is placed into the test chamber and communicates wirelessly with the antenna in the test chamber. Wireless transmissions of this type experience OTA path loss between the DUT antenna and the antenna of the test chamber.

An OTA test system typically includes multiple OTA test stations that are used to test multiple wireless DUTs in parallel. Each OTA test station typically includes its own test chamber, test unit, and test host. A production DUT is placed into the test chamber of each test station during product testing. Typical product testing involves measuring the wireless performance of each DUT and applying pass/fail criteria.

The radio-frequency path of each test station has its own unique OTA path loss characteristic. These unique path losses should be taken into account for accurate testing. Path loss characterization is sensitive to the location (placement) of the test chamber antenna within the test chamber and varies as a function of operating frequency. As a result, calibrating the path loss of a test station with a single test chamber antenna may provide inaccurate measurements as the placement of the test chamber antenna and testing conditions change over time.

It would therefore be desirable to be able to provide improved calibration techniques for calibrating OTA test systems.

SUMMARY

Test stations having multiple antennas may be calibrated for product testing. A test station may include a test host, a multiport test unit, and a test chamber having multiple test chamber antennas. The test chamber antennas may be connected to corresponding radio-frequency (RF) ports in the test unit through respective RF cables.

For example, a first test chamber antenna may be connected to a first RF port in the test unit through a first RF cable, a second test chamber antenna may be connected to a second RF port in the test unit through a second RF cable, a third test chamber antenna may be connected to a third RF port in the test unit through a third RF cable, etc.

A calibration device under test (DUT) may be placed into the test chamber to perform path loss calibration. The calibration DUT may be connected to the test host through a control line. During path loss calibration operations, the test host may direct the test unit to transmit and/or receive RF signals to and from the calibration DUT through the test chamber antennas one at a time. The test host may compute path loss values associated with each of the multiple test chamber antennas at desired frequencies.

A preferred antenna list may be generated based on the path loss values gathered by the test host during calibration operations. For example, a selected one of the multiple test chamber antennas may be indicated to be a preferred antenna if that antenna provides the least amount of path loss at a particular operating frequency. The preferred antenna list shows the preferred antenna that should be enabled to perform desired measurements during product testing at each desired frequency.

The calibrated test chamber may be used to perform product testing. The test host may configure the test unit to send/receive RF signals through the preferred antenna based on the preferred antenna list. The test station may be used to perform desired measurements on production DUTs using the preferred antenna (while disabling the remaining test chamber antennas).

In another suitable arrangement, a test station may include a test host, a test unit, a test chamber with multiple test chamber antennas, and a multiplexer circuit. The multiplexer circuit may have a given RF connector that is connected one of the multiple ports of the test unit through a given RF cable. The multiplexer circuit may have additional RF connects that are each connected to a corresponding one of the multiple test chamber antennas through a respective RF cable. The test host may configure the multiplexer circuit to connect the given RF connector to a desired one of the additional RF connectors during calibration and product testing operations.

Further features of the present invention, its nature and various advantages will be more apparent from the accompanying drawings and the following detailed description.

DETAILED DESCRIPTION

Wireless electronic devices include antenna and transceiver circuitry that supports wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
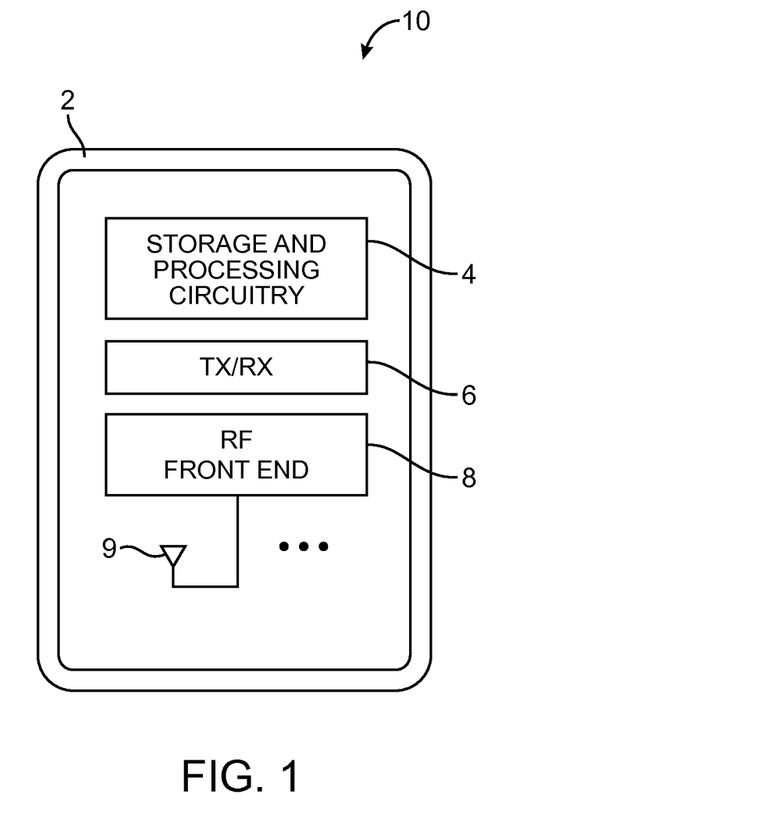
FIG. 1 is a diagram of an illustrative wireless device under test with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a computer, a multimedia device, or other electronic equipment. DUT 10 may have a device housing such as housing 2 that forms a case for its associated components.

DUT 10 may have storage and processing circuitry such as storage and processing circuitry 4. Storage and processing circuitry 4 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 4 may be used to control the operation of device 10. This processing circuitry may be based on one or more microprocessors, microcontrollers, digital signal processors, application specific integrated circuits, etc.

Circuitry 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, circuitry 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to circuitry 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Circuitry 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Figure 2:
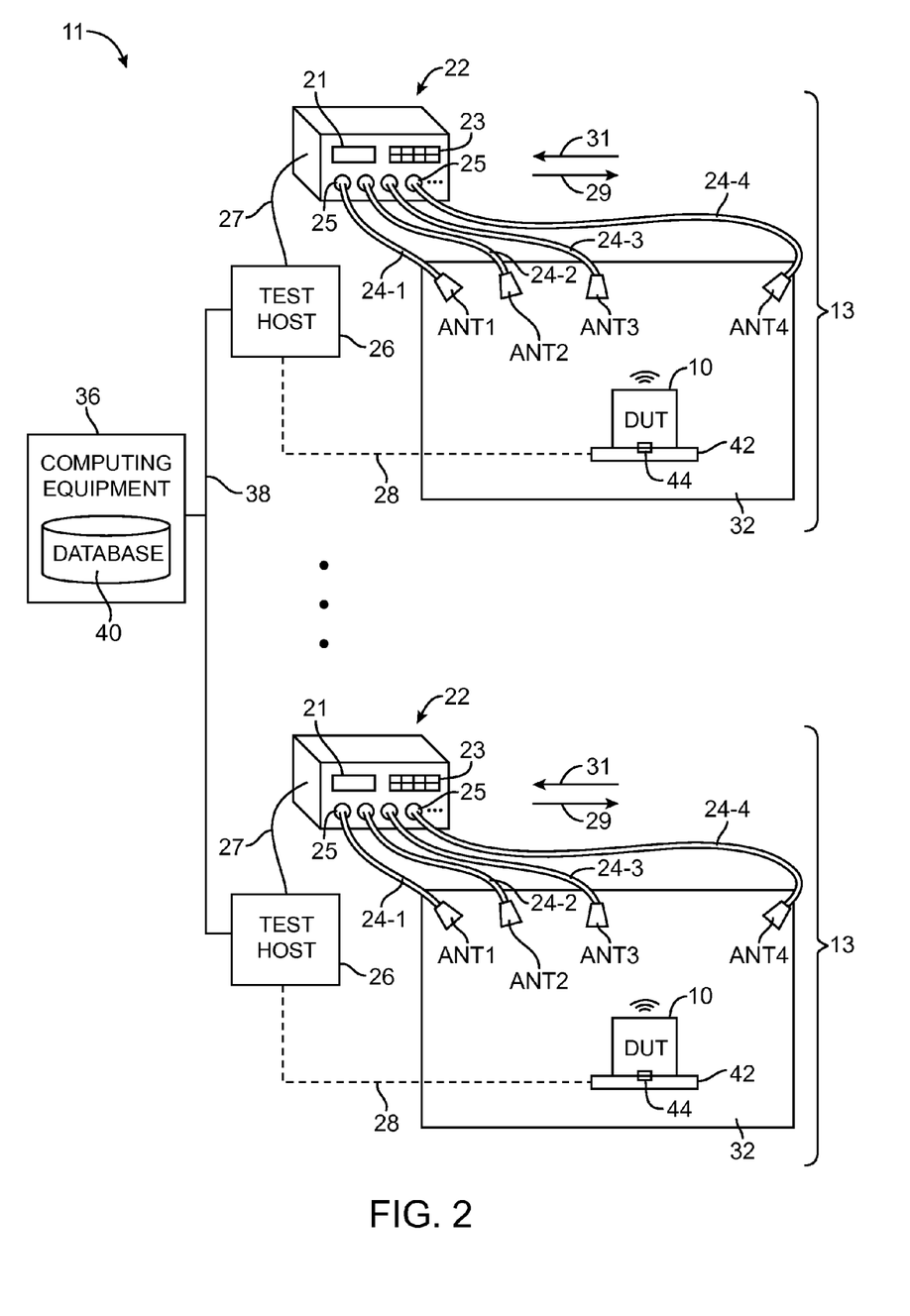
FIG. 2 is a diagram of illustrative test stations each connected to computing equipment and each including a test chamber, a multiport test unit, and a test host in accordance with an embodiment of the present invention.

During product testing, many wireless devices (e.g., hundreds, thousands, or more of DUTs 10) may be tested in a test system such as test system 11 of FIG. 2. Test system 11 may include tests, test accessories, computers, network equipment, tester control boxes, cabling, test chambers with antennas, and other test equipment for transmitting and receiving radio-frequency test signals and gathering test results. Test system 11 may include multiple test stations such as test stations 13. There may, for example, be 80 test stations 13 at a given test site. Test system 11 may include any desired number of test stations to achieve desired test throughput.

Each test station 13 may include a test chamber such as test chamber 32, a test unit such as test unit 22, and a test host such as test host 26 (e.g., a personal computer). Test chambers 32 may be used during product testing to measure the performance of production (factory) DUTs 10.

Each test chamber 32 may have a cubic structure (six planar walls), a rectangular prism-like structure (six rectangular walls), a pyramid structure (four triangular walls with a rectangular base), or other suitable structures.

Test chambers 32 may each include multiple antennas such as antennas ANT1-ANT4 mounted inside the chamber (as an example). Antennas ANT1-ANT4 may sometimes be referred to as test chamber antennas or OTA antennas. Antennas ANT1-ANT4 may, for example, be patch antennas, horn antennas, or other types of antennas. Test chamber 32 may therefore be referred to as a multi-antenna test chamber, because test chamber 32 contains more than one antenna. The test chamber antennas (e.g., antennas ANT1-ANT4) may be placed at any desired location within test 13 using any suitable orientation.

During product testing, DUT 10 may be placed inside test chamber 32 to test for the performance (e.g., the output power level, etc.) of DUT 10 while the test chamber antennas communicate wirelessly with antenna(s) 9 of DUT 10.

Test unit (tester) 22 in each test station 13 may be a radio communications tester of the type that is sometimes referred to as a test box or a radio communications tester. Test unit 22 may be used to perform radio-frequency signaling tests for a variety of different radio-frequency communications bands and channels.

Test unit 22 may be a multiport test box (as an example). As shown in FIG. 2, test unit 22 may have first, second, third, and fourth ports 25 to which RF cables may be connected. In the example of FIG. 2, first RF cable 24-1 may be connected between first port 25 and first antenna ANT1 so that RF signals may be conveyed between test unit 22 and DUT 10 through ANT1 during a first time period, whereas second RF cable 24-2 may be connected between second port 25 and second antenna ANT2 so that RF signals may be conveyed between test unit 22 and DUT 10 through ANT2 during a second time period, whereas third RF cable 24-3 may be connected between third port 25 and third antenna ANT3 so that RF signals may be conveyed between test unit 22 and DUT 10 through ANT3 during a third time period, and whereas fourth RF cable 24-4 may be connected between fourth port 25 and fourth antenna ANT4 so that RF signals may be conveyed between test unit 22 and DUT 10 through ANT4 during a fourth time period.

Test station 13 with test unit 22 connected to antennas ANT1-ANT4 of test chamber 32 using the RF cables (i.e., RF cables 24-1, 24-2, 24-3, and 24-4) in this way may be used to perform OTA testing of wireless electronic devices. For example, a DUT 10 may be placed within test chamber 32 during product testing. In this arrangement, RF signals may be conveyed between transceiver circuitry 6 of DUT 10 and test unit 22 while activating a selected one of antennas ANT1-ANT4.

The arrangement of FIG. 2 is merely illustrative. If desired, test chamber 32 may have more than four antennas or less than four antennas. If desired, test unit 22 may have more than four RF ports or less than four RF ports. Depending on the number of test chamber antennas placed within test chamber 32, a corresponding number of RF cables may be used to connect the test chamber antennas to respective ports 25 in test unit 22.

Test unit 22 may be operated directly or via computer control (e.g., when test unit 22 receives commands from test host 26). When operated directly, a user may control test unit 22 by supplying commands directly to the test unit using the user input interface of the test unit. For example, a user may press buttons in a control panel 23 on the test unit while viewing information that is displayed on a display 21 in the test unit. In computer controlled configurations, a test host such as computer 26 (e.g., software running autonomously or semi-autonomously on the computer) may communicate with the test unit (e.g., by sending and receiving data over a wired path 27 or a wireless path between the computer and the test unit).

Test host 26 may be coupled to DUT 10 through wired path 28 or a wireless path between test host 26 and DUT 10. Connected in this way, test host 26 may send commands over path 28 to configure DUT 10 to perform desired operations during path loss calibration operations and during product testing.

In one suitable arrangement, test host 26 may be connected to a test fixture such as test fixture 42 through path 28 (see, e.g., FIG. 2). Fixture 42 may have an RF connector such as RF connector 44 mounted on its surface. DUT 10 may have a corresponding RF connector that is used to mate with RF connector 44 during testing. In the mated state, data may be conveyed between test host 26 and DUT 10 over path 28.

Test unit 22 may be used to characterize uplink and downlink behaviors of DUT 10. During uplink characterization, DUT 10 may send wireless signals through one of the RF cables in the direction of arrow 31. Test unit 22 may be used to measure an output power level, frequency response, gain, linearity, and other performance parameters of DUT 10 at desired frequencies.

During downlink characterization, test unit 22 may be used to send wireless signals through one of the RF cables in the direction of arrow 29. Measurements such as a receive power level may then be taken at DUT 10. Test stations 13 may therefore be referred to as bidirectional, because test stations 13 can be used to measure both uplink and downlink characteristics.

Each test station 13 should be calibrated prior to testing to ensure that measurements taken across the different test stations are accurate. Sources of offset (error) that may exist from one test station to another include OTA path loss (e.g., path loss associated with the propagation of radio-frequency signals as they propagate through air, path loss associated with the behavior of each of the test chamber antennas during actual wireless transmission, etc.), RF cable path loss (e.g., path loss associated with each RF cable), and variations in each test unit 22 (e.g., process, voltage, and temperature variations that may affect the operation of each tester).

Path loss can be defined as the attenuation in power as wireless signals propagate through a particular medium. The OTA path loss and RF cable path loss in each test station 13 are typically unique, because it is challenging to manufacture test components (e.g., the test chamber antennas, RF cables 24, etc.) that are exactly identical to one another and to configure each test station 13 with an identical spatial arrangement. Path loss may be sensitive to the location of the test chamber antennas and to the placement of DUT 10 within the test chamber.

Similarly, the manufacturing of identical test units 22 may be equally if not even more challenging. In addition to manufacturing variations, operational variations such as voltage and temperature variations may cause each test unit 22 to behave differently during actual testing conditions.

As a result, it may be necessary to take into account an overall test station path loss (e.g., it is necessary to calibrate the OTA path loss, RF cable path loss, and test unit variations) when calibrating a test station 13.

Uplink and downlink path loss may be approximately equal for wireless devices that support time division duplexing (TDD) protocols such as IEEE 802.11 protocols (sometimes referred to as WiFi® protocols), the Bluetooth® protocol, etc. For example, wireless devices that support time division duplexing protocols may exhibit an uplink path loss of 29 dB and a downlink path loss of 29 dB. For TDD systems, calibration of only one path (i.e., calibration of uplink path loss or downlink path loss) is necessary, because the transmit circuitry and receive circuitry operate at the same frequency.

Calibration techniques that take into account the OTA path loss, RF cable path loss, and test unit variations of each test station 13 are desirable. Path loss calibration may be sensitive to the location (placement) of the test chamber antennas within test chamber 32. The sensitivity of each test chamber antenna may also vary as a function of operating frequency. As a result, a calibration DUT (e.g., a reference DUT that is sampled from a group of production DUTs and that is determined to exhibit performance levels representative of the group of production DUTs) may be used to calibrate test station 13 at desired frequencies.

In particular, different path loss values can be computed by performing path loss calibration measurements while enabling the test chamber antennas one at a time at a desired frequency. Path loss values measured using the different antennas may differ from one another, because of the difference in placement and/or orientation of the antennas within test chamber 32. The antenna that provides the optimal path loss (e.g., the least negative path loss value) may be selected as the preferred antenna for that desired frequency. An antenna that is the selected as the preferred antenna for one particular frequency may not necessarily be selected as the preferred antenna for another frequency, because the performance and location of each test chamber antenna may vary as a function of frequency. A preferred antenna can be determined for each desired frequency using this approach to compile a list of preferred antennas (or a preferred antenna list).

During product testing, production DUTs 10 may be tested in test chamber 32 at the desired frequencies. At each desired frequency, a preferred antenna may be selected based on the preferred antenna list to perform desired measurements (e.g., to determine whether a production DUT 10 satisfies pass/fail criteria). Performing product testing in this way reduces measurement sensitivity to the location of the test chamber antennas in test chamber 32 across the desired frequencies and optimizes testing to increase yield.

Figure 3:
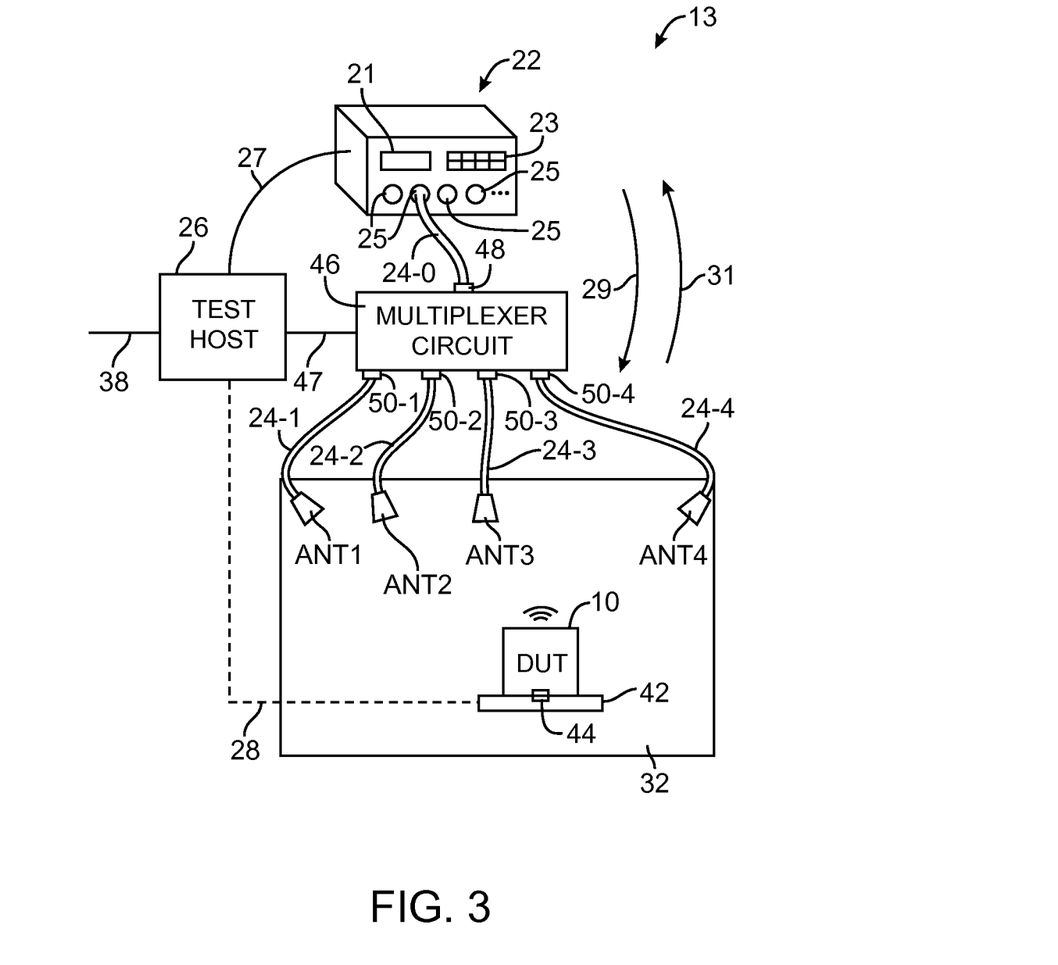
FIG. 3 is a diagram of an illustrative test station that includes a test chamber, a test unit, a test host, and a multiplexer circuit in accordance with an embodiment of the present invention.

Another suitable arrangement of test station 13 with multiple antennas is shown in FIG. 3. As shown in FIG. 3, test station 13 may include test host 26, test unit 22, test chamber 32, and a multiplexer circuit such as multiplexer circuit 46. Multiplexer circuit 46 may have input-output (I/O) connectors such as RF connectors 48, 50-1, 50-2, 50-3, and 50-4. Multiplexer circuit 46 may have a control input that is connected to test host 26 through line 47. Test host 26 may send control signals over line 47 to configure multiplexer circuit 46 to electrically connect RF connector 48 to a selected one of RF connectors 50-1, 50-2, 50-3, and 50-4 (as an example).

RF connector 48 of multiplexer circuit 46 may be connected to one of the multiple ports 25 of test unit 22 through RF cable 24-0. For example, RF connector 48 may be connected to second port 25 of test unit 22 (see, e.g., FIG. 3). First RF cable 24-1 may be used to connect antenna ANT1 to connector 50-1 of circuit 46, whereas second RF cable 24-2 may be used to connect antenna ANT2 to connector 50-2 of circuit 46, whereas third RF cable 24-3 may be used to connect antenna ANT3 to connector 50-3 of circuit 46, and whereas fourth RF cable 24-4 may be used to connect antenna ANT4 to connector 50-4 of circuit 46. Multiplexer circuit 46 may be a bidirectional multiplexing circuit (e.g., RF signals may travel from connector 48 to a selected one of connectors 50-1, 50-2, 50-3, and 50-4 in the direction of arrow 29 or RF signals may travel from a selected one of connectors 50-1, 50-2, 50-3, and 50-4 to connector 48 in the direction of arrow 31). As a result, test station 13 of FIG. 3 may be used to perform uplink or downlink path loss measurements (as an example).

The test station setup shown in FIG. 3 is merely illustrative. Other suitable configurations that allow OTA calibration and test measurements with multiple antennas may be used, if desired.

Figure 4:
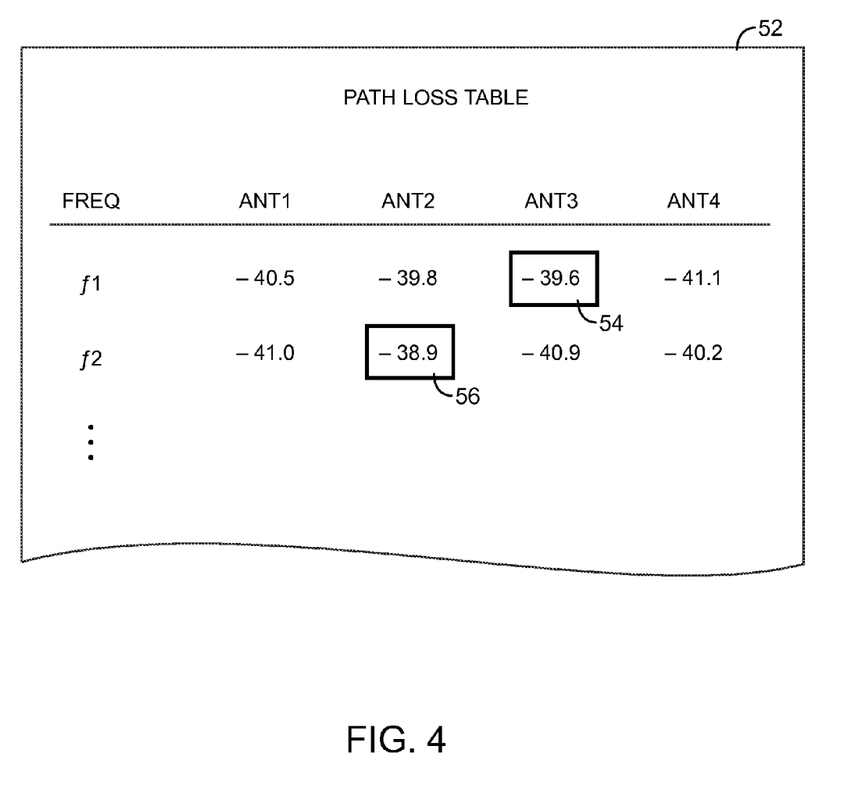
FIG. 4 is a table of illustrative path loss values computed using a calibration device under test at desired frequencies in accordance with an embodiment of the present invention.

Path loss values gathered using a calibration DUT during path loss calibration operations may be recorded in a path loss table such as path loss table 52, as shown in FIG. 4. FIG. 4 shows path loss values in units of dBm. Power in terms of dBm expresses power relative to 1 mW in units of decibels. Path loss table 52 may store path loss measurement results for multiple test chamber antennas at the desired frequencies.

For example, consider a scenario in which test chamber antennas ANT1-ANT4 are used to calibrate test station 13. During a first time period, the calibration DUT may communicate wirelessly with test unit 22 through antenna ANT1 at frequency f1. A path loss value of −40.5 dBm may be computed during the first time period and may be recorded in path loss table 52. Antenna ANT2 may be switched into use to compute a path loss value of −39.8 dBm during a second time period, whereas antenna ANT3 may be switched into use to compute a path loss value of −39.6 dBm during a third time period, and whereas antenna ANT4 may be switched into use to compute a path loss value of −41.1 dBm during a fourth time period (at frequency f1).

Similarly, path loss values may be computed using antennas ANT1-ANT4 at other desired frequencies (e.g., frequencies f2, f3 . . . ). For example, path loss values of −41.0 dBm, −38.9 dBm, −40.9 dBm, and −40.2 dBm may be computed by performing measurements at frequency f2 with antennas ANT1, ANT2, ANT3, and ANT4, respectively (see, e.g., FIG. 4). If desired, path loss table 52 may record path loss values for any number of antennas at any desired operating frequencies.

A preferred antenna may be chosen for each frequency based on the path loss values recorded in table 52. In general, it may be desirable to select the test chamber antenna that provides the least amount of path loss (i.e., that provides the least negative path loss value) as the preferred antenna for each frequency. In the example of FIG. 4, antenna ANT3 may be selected as the preferred antenna because ANT3 provides the least negative path loss value at frequency f1 (as indicated by highlighted box 54), whereas antenna ANT2 may be selected as the preferred antenna because ANT2 provides the least negative path loss value at frequency f2 (as indicated by highlighted box 56). If desired, test chamber antennas that provide the most negative path loss values or that provide average (intermediate) path loss values may be selected as the preferred antennas. If desired, test chamber antennas may be selected based on a user-defined criterion (e.g., test chamber antennas that perform satisfactorily may be selected).

As shown in FIG. 2, each test station 13 may be connected to computing equipment 36 through line 38. Computing equipment 36 may include storage equipment on which a database 40 is stored. Table 52 may be stored in database 40.

Figure 5:
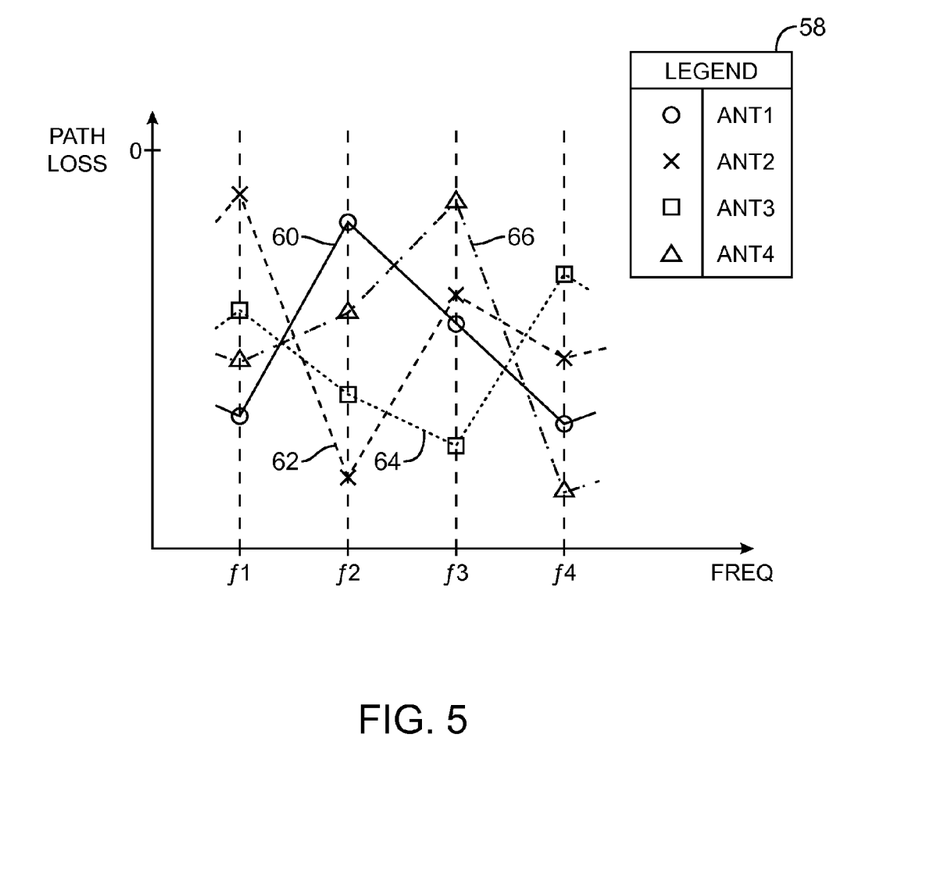
FIG. 5 is an illustrative graph showing how path loss values may vary as a function of frequency for different test chamber antennas in accordance with an embodiment of the present invention.

FIG. 5 is a graphical representation of the path loss table of the type described in connection with FIG. 4. The graph in FIG. 5 plots path loss as a function of frequency for four different antennas ANT1-ANT4. As shown in legend 58, symbol "o" corresponds to path loss data computed while antenna ANT1 is switched into use (e.g., while antenna ANT1 is enabled and while ANT2-ANT4 are disabled), symbol "x" corresponds to path loss data computed while ANT2 is switched into use, symbol "☐" corresponds to path loss data computed while ANT3 is switched into use, and symbol "Δ" corresponds to path loss data computed while ANT4 is switched into use. Line 60 contains the path loss data points for antenna ANT1 computed across frequencies f1-f4, whereas line 62 contains the path loss data points for antenna ANT2 computed across frequencies f1-f4, whereas line 64 contains the path loss data points for antenna ANT3 computed across frequencies f1-f4, and whereas line 66 contains the path loss data points for antenna ANT4 computed across frequencies f1-f4 (as examples).

As shown in the graph of FIG. 5, antenna ANT2 exhibits the least negative path loss value at frequency f1, whereas antenna ANT1 exhibits the least negative path loss value at frequency f2, whereas antenna ANT4 exhibits the least negative path loss value at frequency f3, and whereas ANT3 exhibits the least negative path loss value at frequency f4. It can be observed from FIG. 5 that a test chamber antenna that provides the optimal path loss value at one frequency may not necessarily provide acceptable path loss values at other frequencies. For example, antenna ANT2 provides the least negative path loss value at frequency f1 but provides the most negative path loss value at frequency f2.

Figure 6:
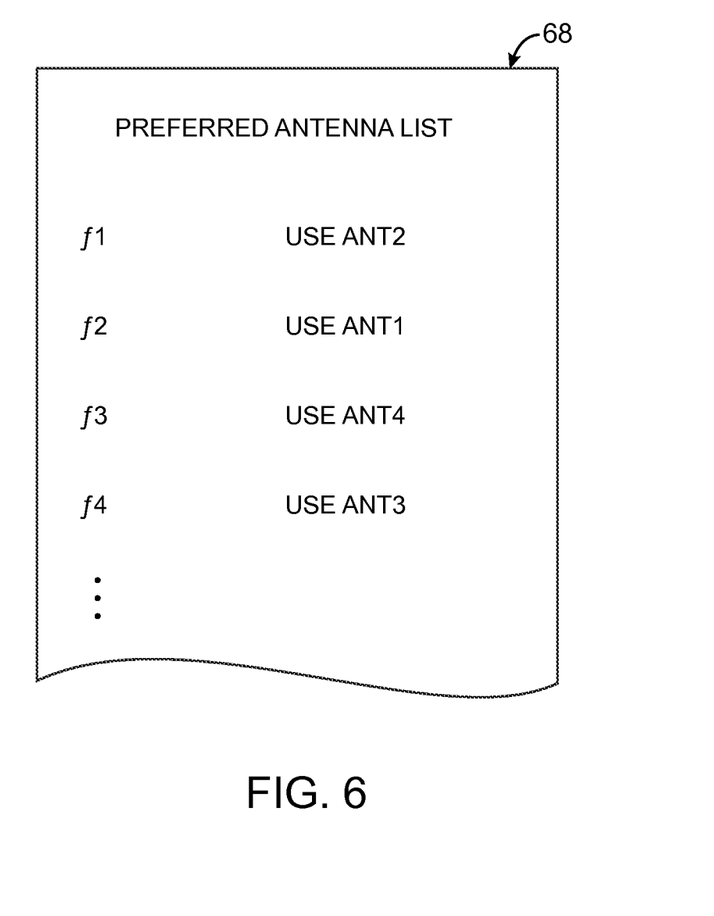
FIG. 6 is an illustrative preferred antenna list generated using the calibration results of FIG. 5 in accordance with an embodiment of the present invention.

FIG. 6 shows a preferred antenna list such as preferred antenna list 68 that can be generated based on the results of FIG. 5. Antenna ANT2 may be selected as the preferred antenna for frequency f1, because ANT2 exhibits the optimal (e.g., least negative) path loss value at frequency f1. Antennas ANT1 may be selected as the preferred antenna for frequency f2, because ANT1 exhibits the optimal path loss value at frequency f2. Antenna ANT4 may be selected as the preferred antenna for frequency f3, because ANT4 exhibits the optimal path loss value at frequency f3. Antenna ANT3 may be selected as the preferred antenna for frequency f4, because ANT3 exhibits the optimal path loss value at frequency f4. Preferred antenna list 68 may contain information showing the preferred antennas that should be used at the desired frequencies during product testing. For example, consider a scenario in which a user of test station 13 wants to test a production DUT at frequency f3. In this example, the user should configure test station 13 to perform measurements using ANT4 (i.e., the preferred antenna according to list 68 of FIG. 6).

Preferred list 68 may be stored in database 40 on computing equipment 36 and may be retrieved by test host 26 or a user of test system 11 during product testing. If desired, preferred list 68 may be stored in storage and processing circuitry 4 of production DUT 10.

Figure 7:
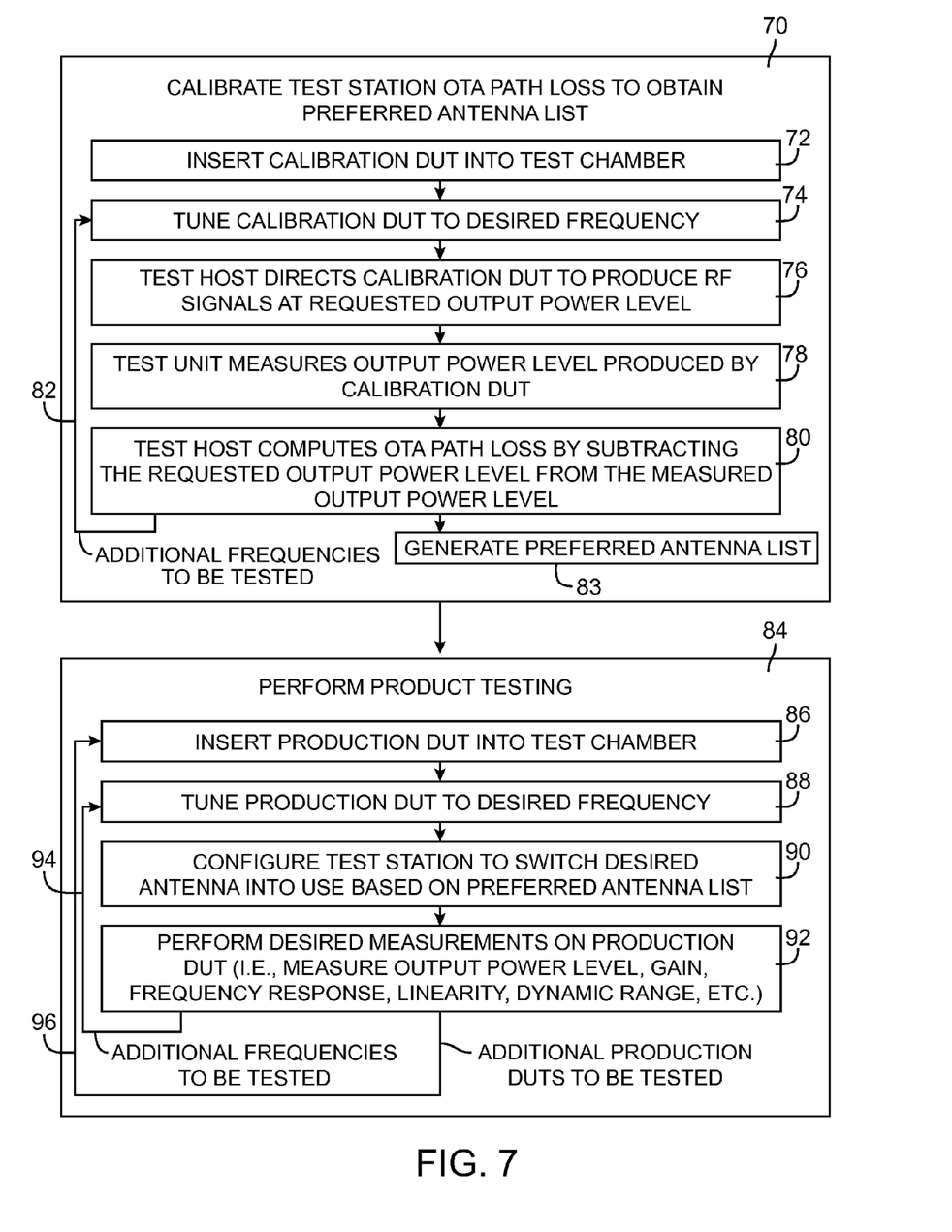
FIG. 7 is a flow chart of illustrative steps involved in calibrating a test station and performing product testing operations with the calibrated test station in accordance with an embodiment of the present invention.

FIG. 7 shows detailed steps involved in calibrating test station 13 and using test chamber 32 during product testing. At step 70, test station 13 may be calibrated to obtain a preferred antenna list of the type described in connection with FIG. 6. A calibration DUT may be placed into test chamber 32 (step 72). The calibration DUT may be tuned to a desired frequency (step 74).

Test host 26 may configure the calibration DUT to produce RF signals at a requested output power level (step 76). For example, test host 26 may direct the calibration DUT to produce RF signals at the maximum output power level by sending commands over line 28. Test unit 22 may then be used to measure the output power level produced by the calibration DUT (step 78). Test host 26 may compute an OTA path loss by subtracting the requested output power level from the measured output power level (step 80). OTA path loss values computed using this approach may be stored in table 52 of the type described in connection with FIG. 4.

Processing may loop back to step 74 if there are additional frequencies to be tested, as indicated by path 82. If desired, additional calibration DUTs may be used to gather more path loss data points to ensure accuracy of calibration step 70. At step 83, preferred antenna list 68 may then be generated based on the results stored in table (e.g., the test chamber antenna that provides the least negative path loss value may be selected as the preferred antenna for each desired frequency). The preferred antenna list may be determined using computing equipment associated with the test system, using computing equipment that communicates with the test system over a communications network, using equipment such as test host 26, using computing equipment such as a processor in test unit 22, using computing equipment 36, or using other computing equipment.

At step 84, calibrated test station 13 may be used to perform product testing. During product testing, a production DUT may be placed into test chamber 32 (step 86). The production DUT may be tuned to a desired frequency (step 88). Test host 26 may configure test station 13 to switch a preferred antenna into use based on preferred antenna list (step 90).

For example, consider a scenario in which test station 13 of FIG. 2 is used to perform product testing. In this example, test host 26 may configure test unit 22 to send and/or receive signals through a selected one of its ports 25 that is associated with the preferred antenna while blocking RF signals from being transmitted and/or received through remaining ports 25. Consider another scenario in which test station 13 of FIG. 3 is used to perform product testing. In this example, test host 26 may configure multiplexer circuit 28 to connect RF connector 48 to a selected one of RF connectors 50-1, 50-2, 50-3, and 50-4 so that RF signals can be conveyed between test unit 22 and the preferred antenna.

After the preferred antenna has been switched into use, test station 13 may perform desired measurements on the production DUT (e.g., test station 13 may measure the output power level, gain, frequency response, linearity, dynamic range, and other performance parameters of the production DUT), as shown in step 92. Processing may loop back to step 88 if there are additional frequencies to be tested, as indicated by path 94 (e.g., a new preferred antenna may be switched into use based on the preferred antenna list when performing product testing at another desired frequency). Pass/fail criteria may be applied to each production DUT to determine whether a production DUT satisfies design criteria based on the measured performance parameters. Processing may loop back to step 96 if there are additional production DUTs to be test, as indicated by path 96.

Calibrating a test station and performing product testing using the calibrated test station in this way may provide reduced sensitivity to antenna placement and reduced sensitivity to frequency variations.

The foregoing is merely illustrative of the principles of this invention and various modifications can be made by those skilled in the art without departing from the scope and spirit of the invention.

What is claimed is:
1. A method for performing wireless testing with a test station during manufacturing, wherein the test station includes a test chamber having a plurality of test chamber antennas, a test unit, and radio-frequency cables that connect the test chamber antennas to the test unit, the method comprising:
   with the test station, testing a device under test by passing radio-frequency signals between a selected one of the test chamber antennas and the device under test while preventing radio-frequency signals from passing between the test chamber antennas other than the selected one of the test chamber antennas and the device under test.
2. The method defined in claim 1, further comprising:
   with a calibration device under test, calibrating the test station to obtain over-the-air path loss values.
3. The method defined in claim 2, wherein calibrating the test station to obtain the over-the-air path loss values comprises:
   enabling the test chamber antennas one at a time to compute an over-the-air path loss value associated with each of the test chamber antennas.
4. The method defined in claim 2, wherein calibrating the test station to obtain the over-the-air path loss values comprises:

with a test host, directing the calibration device under test to transmit calibration radio-frequency signals to a given one of the test chamber antennas at a request output power level;

with the test unit, measuring an output power level while the calibration device under test is transmitting the calibration radio-frequency signals to the given one of the test chamber antennas; and with the test host, computing an over-the-air path loss value associated with the calibration radio-frequency signals passing between the given one of the test chamber antennas and the calibration device under test.

5. The method defined in claim 4, wherein computing the over-the-air path loss value associated with the calibration radio-frequency signals passing between the given one of the test chamber antennas and the calibration device under test comprises:

subtracting the requested output power level from the measured output power level.

6. The method defined in claim 2, wherein the test station is connected to computing equipment and wherein the selected one of the test chamber antennas is a preferred antenna, the method further comprising:

storing the over-the-air path loss values in a database that is stored on the computing equipment; and with a test host, retrieving the over-the-air path loss values from the database to determine which one of the test chamber antennas is the preferred antenna.

7. The method defined in claim 6, wherein retrieving the over-the-air path loss values from the database to determine which one of the test chamber antennas is the preferred antenna comprises:

selecting one of the test chamber antennas that provides the least amount of path loss as the preferred antenna.

8. The method defined in claim 7, further comprising:

performing path loss calibration at desired frequencies to obtain a preferred antenna list, wherein the preferred antenna list indicates the preferred antenna for use during product testing for each of the desired frequencies.

9. The method defined in claim 6, wherein retrieving the over-the-air path loss values from the database to determine which one of the test chamber antennas is the preferred antenna comprises:

selecting one of the test chamber antennas based on a user-defined criterion.

10. The method defined in claim 1, wherein the test unit has multiple ports, wherein the selected one of the test chamber antennas is connected to a given one of the multiple ports, and wherein the test chamber antennas other than the selected one of the test chamber antennas are connected to the ports other than the given one of the multiple ports in the test unit, the method further comprising:

during product testing, allowing the radio-frequency signals to pass through the given one of the multiple ports while preventing the radio-frequency signals from passing through the ports other than the given one of the multiple ports in the test unit.

11. The method defined in claim 1, wherein the test station further includes a multiplexer circuit, wherein the multiplexer circuit has a given connector that is connected to a port in the test unit, and wherein the multiplexer circuit has additional connectors that are connected to the test chamber antennas, the method further comprising:

during product testing, connecting the given connector to a selected one of the additional connectors that is connected to the selected one of the test chamber antennas.

12. A test system that includes a test station, wherein the test station comprises:

a test host;

a test unit that has multiple ports and that is connected to the test host; and a test chamber having a plurality of antennas, wherein the antennas are connected to the test unit and wherein during product testing, the test host directs the test unit to pass radio-frequency signals through a selected one of the multiple ports in the test unit while preventing radio-frequency signals from passing through the ports other than the selected one of the multiple ports in the test unit.

13. The test system defined in claim 12, wherein each of the antennas is connected to a corresponding port in the test unit through a respective radio-frequency cable.

14. The test system defined in claim 12, wherein the antennas comprise patch antennas.

15. The test system defined in claim 12, wherein the test unit comprises a multiport radio-frequency test box.

16. The test system defined in claim 12, wherein the test station comprises one of a plurality of test stations, the test system further comprising:

computing equipment, wherein the test host in each of the plurality of test stations is connected to the computing equipment and wherein data gathered at each test station is sent to a database stored on the computing equipment.

17. A test system for making wireless measurements on devices under test, wherein the test system includes a wireless test station and wherein the wireless test station comprises:

a test unit;

a test chamber having a plurality of antennas within the test chamber;

at least one antenna with which the wireless measurements on the devices under test are made; and a multiplexer circuit coupled between the test unit and the test chamber.

18. The test system defined in claim 17, wherein the multiplexer circuit includes a given connector that is connected to a port in the test unit through a given radio-frequency cable and includes additional connectors that are connected to the antennas in the test chamber.

19. The test system defined in claim 18, wherein the wireless test station further comprises a test host and wherein the test host configures the multiplexer circuit to connect the given connector to a selected one of the additional connectors during product testing.

20. The test system defined in claim 19, wherein the wireless test station comprises one of a plurality of wireless test stations, the test system further comprising:

computing equipment, wherein the test host in each of the plurality of wireless test stations is connected to the computing equipment and wherein data gathered at each wireless test station is sent to a database stored on the computing equipment.

21. The test system defined in claim 18, wherein the antennas comprise path antennas.

22. A method of calibrating wireless test equipment that includes a test chamber having a plurality of antennas for wirelessly testing devices under test during manufacturing to determine whether the devices under test are performing satisfactorily, comprising:

gathering over-the-air path loss measurements for the plurality of antennas at each of a plurality of frequencies by making wireless measurements with the antennas in the test chamber; and determining, for each of the plurality of frequencies, which of the antennas to use in wirelessly testing the devices under test during manufacturing based on the over-the-air path loss measurements.

23. The method defined in claim 22 wherein determining which of the antennas to use comprises:
   determining, for each of the plurality of frequencies, which of the plurality of antennas at that frequency is associated with a minimum amount of over-the-air path loss.

24. A method of using wireless test equipment that includes a test chamber having a plurality of antennas to wirelessly test devices under test during manufacturing to determine whether the devices under test are performing satisfactorily, comprising:
   with the wireless test equipment, testing the wireless devices under test at each of a plurality of radio-frequency test frequencies by using, for each of the plurality of radio-frequency test frequencies, a selected one of the plurality of antennas based on a preferred antenna list.

\* \* \* \* \*